United States Patent Office 2,913,454
Patented Nov. 17, 1959

2,913,454

CERTAIN CYCLOALKANOTRIAZOLES, PROCESS AND INTERMEDIATES

Siegfried Petersen, Ernst Tietze, and Wolfgang Wirth, Leverkusen-Bayerwerk, Germany, assignors to Schenley Industries, Inc., New York, N.Y., a corporation of Delaware No Drawing. Application November 23, 1956
Serial No. 623,828

23 Claims. (Cl. 260—239)

This invention relates to a new and useful method of preparing derivatives of hydrazine and triazole and partially to novel organic chemical compounds. More particularly, it is concerned with certain novel condensation products of cyclic lactime-O-alkyl ethers with acylhydrazines which, when cyclized, yield certain novel and useful compounds. The cyclized final products, for instance, may be used as analeptics, as central nervous system and respiratory system stimulants; and both the cyclized and uncyclized condensation products may be used as intermediates in synthesis of other pharmaceutical compounds, dyes, textile aids, pesticides and the like.

Examples of lactime ethers that may be used in practice of this invention are butyrolactime-O-alkyl ethers, valerolactime-O-alkyl ethers, caprolactime-O-alkyl ethers, caprylolactime-O-alkyl ethers, and caprinolactime-O-alkyl ethers, i.e. cyclic lactime ethers containing 4 to 10 carbon atoms. Cyclic lactime-O-alkyl ethers with heteroatoms in the ring in addition to the nitrogen atom of the lactime group may be used satisfactorily. As a rule, the methyl and ethyl ethers are used, but higher alkyl ethers, such as those described in German Patents 532,969 and 863,056, also may be employed.

These lactime-O-alkyl ether compounds react with monoacylated hydrazines under relatively mild conditions to form the desired condensation products. Among the acylhydrazines that may be used satisfactorily in practicing this invention are carboxylic acid hydrazides, such as hydrazides of fatty acids, e.g. formylhydrazine and acetylhydrazine, as well as hydrazides of higher fatty acids; hydrazides of methoxyacetic and cyanoacetic acid; hydrazides of aromatic and heterocyclic carboxylic acids, e.g. of benzoic acid, alkylated, chlorinated or nitrated benzoic acids, hydroxybenzoic and methoxybenzoic acids, naphthalene-carboxylic acids, pyromucic acid, nicotinic or isonicotinic acid; and the like. Hydrazides of dicarboxylic and polycarboxylic acids, such as of adipic acid or terephthalic acid, also may be used. In addition, hydrazine derivatives of carbonic or thiocarbonic acid may be used, for example, semicarbazides, thiosemicarbazides, carbohydrazides, thiocarbohydrazides, aminoguanidines and the like.

The initial condensation of the lactime-O-alkyl ether with the selected acylhydrazide preferably is effected in an organic solvent reaction medium such as methanol, ethanol, propanol, dioxane, tetrahydrofuran, or glycol monomethyl ether or its acetate. In this reaction, the alkoxy group of the lactime ether is exchanged against the hydrazide radical; in the specific instance of capro- lactime-O-alkyl ether, this process may be represented as follows:

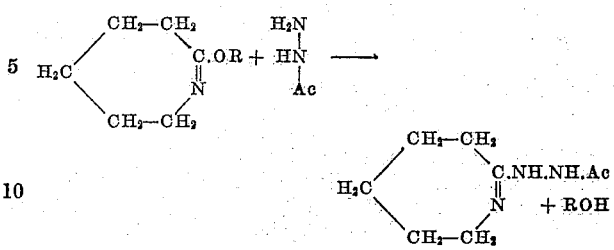

wherein R is an alkyl group and Ac is an acyl group.

In the second stage of the process, which takes place especially readily with hydrazides of carboxylic acids, one mole of water is abstracted from the condensation product and cyclization takes place as follows:

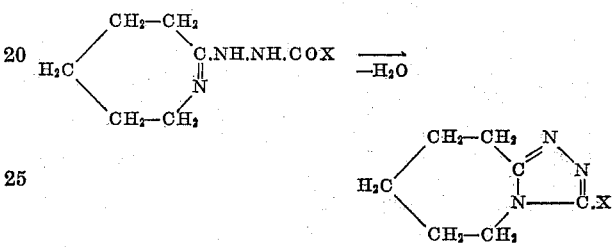

wherein X is a monovalent radical.

The first step reaction takes place readily under mild reaction conditions, i.e. relatively low reaction temperatures i.e. between about 0° C. and about 80° C. preferably at room temperature, and short reaction periods from about 10 minutes to about 20 hours. The reaction time generally depends on the temperature used, lower temperature afford longer times to accomplish the inventive reaction. Use of higher temperatures and longer reaction periods favor further reaction to produce the cyclized products of the second step above described. Most times merely heating of the initial reaction mixture sometimes up to about 150° C. is sufficient to effect cyclization with elimination of one mole of water per mole of final product formed. Suitable reaction media for the second process step, in instance where the initial condensation product is isolated from the reaction mixture wherein it is formed, include formic acid, glacial acetic acid, chlorobenzene and the like, generally in higher boiling organic solvents.

Regarded in certain of its broader aspects, the novel compositions of matter according to this invention are the compounds represented by the formula:

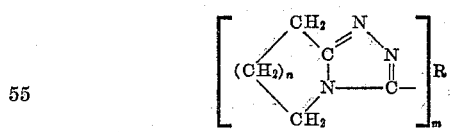

wherein R is a monovalent substituent selected from the group consisting of hydrogen, alkyl having at least two carbon atoms, cyanoalkyl, alkoxyalkyl, phenyl, nitrophenyl, hydroxyphenol, C-pyridyl, C-furyl, and carbamoyl if $m=1$, and alkylene or arylene (divalent) which may be interrupted by heteroatoms like O, S or N if $m=2$, $m$ being a whole number from 1 to 2 and $n$ is a whole number from one to six.

In a more limited sense, the compounds of this invention are the substances of the above formula wherein R is a monovalent substituent selected from the group consisting of hydrogen, cyanomethyl, methoxymethyl, phenyl, p-nitrophenyl, o-hydroxyphenyl, gamma-pyridyl, alpha-furyl, carbamoyl, and ethoxythionocarbonohydrazo. These new compounds are readily obtained in pure, crystalline state. Being nitrogenous organic bases, they readily form salts with acids, for example, the simple mineral acids and the water-soluble, low molecular weight organic carboxylic acids. They are useful in chemotherapy as central nervous system and respiratory stimulants and, because of their analeptic properties, they may be used in shock therapy for treatment of mentally disturbed persons. They may be used, also, as intermediates in synthesis of other pharmaceutical preparations, dyes, textile aids, pesticides and the like.

To facilitate a fuller and more complete understanding of the subject matter of this invention, certain specific examples herewith follow, provided by way of illustration merely and not by way of limitation upon the invention as defined in the subjoined claims.

*Example I*

Synthesis of the compound represented by the formula:

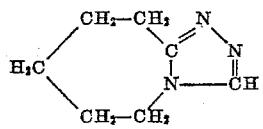

About 60 parts by weight of monoformylhydrazine are dissolved in 400 parts by weight of methanol and, over a period of half an hour, 140 parts by weight of caprolactime-O-methyl ether (10% excess) are added at 20° C., without cooling. The temperature of the reaction mixture spontaneously rises to 55° C. As soon as the temperature has fallen to 25° C., the reaction mixture is boiled under reflux on a water bath for 15 hours, then the methanol and water are completely distilled off in vacuo at 100 C., and the residue thus isolated is distilled in vacuo from a metal bath. With only negligible amounts of forerun and residue, 129 parts by weight, or 94% of theory, of 4,5-pentamethylene-1,2,4-triazole of the formula above set forth, boiling at 239°–241° C. at a pressure of 16 millimeters of mercury are obtained. The colorless distillate solidifies to a crystalline mass melting near 65° C. (the exact melting point cannot be determined because of the extraordinary hygroscopicity of the compound). The compound is very easily water-soluble and its aqueous solution reacts weakly alkaline.

When an aqueous solution of the base compound is mixed with 1 mole of hydrochloric acid and the resultant solution is strongly concentrated by evaporation in vacuo, a well-crystallizing hydrochloride is obtained; this is dried by suction-filtration and washing with ethanol and ether. The hydrochloride is not hygroscopic; it melts with slight decomposition at 228°–230° C. Its aqueous solution reacts acid (pH approximately 3).

*Example II*

Synthesis of the compound represented by the formula:

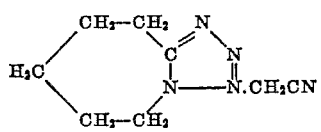

About 49.5 parts by weight of cyanoacetic acid hydrazide are dissolved in 200 parts by weight of methanol, and 64 parts by weight of caprolactime-O-methyl ether are instilled, with stirring, at 30° C. over a period of half an hour; the clear, light-brown solution so obtained is allowed to stand at 20–25° C. for 48 hours. Subsequently, methanol and water are distilled off in vacuo on a water bath at 40°–60° C. The residue, which solidifies to a crystalline cake, is dissolved in an equal amount by weight of glycol monomethyl ether acetate by brief heating. On cooling, 3-cyanomethyl-4,5-pentamethylene-1,2,4-triazole of the formula above set forth crystallizes as coarse crystals that melt at 112°–113° C. About 70–80 parts by weight of the compound are obtained. It is easily water-soluble and its aqueous solution reacts nearly neutral.

The hydrochloride of this base is prepared by dissolving 97 parts by weight of the compound in 300 parts by weight of water with 55 parts by weight of concentrated hydrochloric acid at 20° C., forming a solution which is merely slightly acid to Congo paper. Following decolorization of the solution with charcoal, it is concentrated in vacuo at 40°–50° C. to the point of crystallization. Cooling of the mixture with ice water, followed by suction-filtration and washing with ethanol and ether, yields 70 to 80 parts by weight of the hydrochloride of the base in the form of colourless crystals, which are dried at 70° C. The hydrochloride melts at 253°–255° C., with slight decomposition; it is readily water-soluble, and its aqueous solution reacts weakly acid.

*Example III*

Synthesis of the compound represented by the formula:

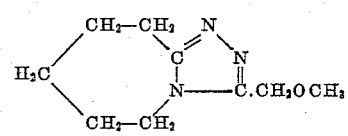

Approximately 52 parts by weight of methoxyactic acid hydrazide are dissolved in 70 parts by weight of methanol; at 10°–15° C., 64 parts by weight of caprolactime-O-methyl ether are instilled into this solution over a period of about one hour. The reaction mixture is allowed to stand at 10°–20° C. for 15 hours, then it is boiled under reflux on a water bath for about two hours. The faintly purple-colored solution so obtained is decolorized by means of charcoal; methanol and water are distilled off under vacuum on a water bath and the oleaginous residue is fractionated in vacuo from a metal bath. Following a small forerun, 68 parts by weight (75% of theory) of 3-methoxy-methyl-4,5-pentamethylene-1,2,4-triazole of the formula above set forth are obtained, distilling at 225–228° C. under a pressure of 15 millimeters of mercury, as a viscous, colorless oil, which does not solidify to crystals. It is readily water-soluble, forming a nearly neutral solution.

If the distilled base, in aqueous solution, is mixed with an equimolecular proportion of hydrochloric acid and the clear solution is concentrated at 50° C. under vacuum until it crystallizes, the non-hygroscopic hydrochloride of the base is obtained. This is purified by recrystallization from methanol and thrown from solution by addition of dry ether. The hydrochloride of the base melts at 156–158° C. and it is very readily water-soluble; its aqueous solution has a pH of 2–3.

*Example IV*

Synthesis of the compound represented by the formula:

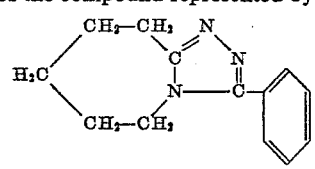

A mixture of about 40.8 parts by weight of benzoylhydrazine and 45 parts by weight of caprolactime-O-methyl ether in 300 parts by weight of methanol is refluxed for 18 hours, the solution is evaporated to dryness in vacuo, the resulting brownish crystals are triturated with cold glacial acetic acid and then filtered under suction. The residual crude product is recrystallized from a large volume of ethyl acetate or acetone. Yield of final product: 33 parts by weight, melting at 132°–134° C. Analysis reveals no oxygen present in this product and indicates its empirical formula to be $C_{13}H_{15}N_3$, i.e. the compound of the structural formula above set forth.

The same compound, 3-phenyl-4,5-pentamethylene-1,2,4-triazole, results if, in above described procedure, the caprolactime-O-methyl ether is replaced by a molecular equivalent amount of caprolactime-O-ethyl ether or a higher O-alkyl ether of caprolactime.

Under analogous conditions, 4-chlorobenzoylhydrazine yields 3-p-chlorophenyl-4,5-pentamethylene-1,2,4-triazole, melting at 171° after being crystallized from glycol monomethyl ether acetate, while 2,4-dichlorobenzoylhydrazine gives 3-o-p-dichlorophenyl-4,5-pentamethylene-1,2,4-triazole, melting at 130–132° after crystallization from ethyl acetate. Finally, by repeating the foregoing procedure using an equimolecular proportion of 4-methoxybenzoylhydrazine instead of the benzoylhydrazine, a compound of the empirical formula $C_{14}H_{17}ON_3$, 3-p-methoxyphenyl-4,5-pentamethylene-1,2,4-triazole, melting at 157–159° C., is obtained.

*Example V*

Synthesis of the compound represented by the formula:

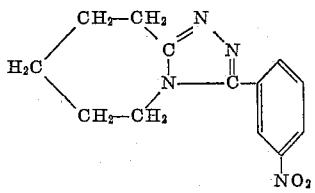

Approximately 48.3 parts by weight of 4-nitrobenzoylhydrazine are suspended in 500 parts by weight of hot ethanol, and 45 parts by weight of caprolactime-O-methyl ether are added, dropwise. Before the addition has been completed, an orange-colored condensate precipitates. The reaction mixture is boiled for 1 hour, then suction-filtered and the residue is extracted with boiling methanol or ethanol. The new intermediate compound so obtained is of analytical purity and melts at 188°–197° C., depending on how rapidly it is heated. Higher melting points of 240°–250° C. are noted for brief periods on the Kofler block. According to analysis, the compound has the empirical formula $C_{13}H_{16}O_3N_4$ and is the compound represented by the following structural formula:

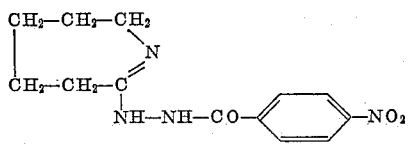

Ring closure of this intermediate to form 3-(4-nitrophenyl)-4,5-pentamethylene-1,2,4-triazole can be accomplished easily by briefly heating of 50 parts by weight of it with 200 parts by weight of glacial acetic acid. The initially orange-colored solution is largely decolorized by this treatment. At the end of the reaction, the solution is diluted with an equal volume of water; it yields a crop of pale-yellow crystals which, after recrystallization from a small quantity of glycol monomethyl ether acetate, melt at 184°–185° C. The yield is approximately 30 parts by weight of final product.

By reducing the intermediate with catalytically activated hydrogen, ring closure occurs simultaneously with conversion of the nitro group into the amino group. The product so obtained, 3-(4'-aminophenyl)-4,5-pentamethylene-1,2,4-triazole, which melts at 210°–212° C., can also be obtained by reduction of 3-(4-nitrophenyl)-4,5-pentamethylene-1,2,4-triazole).

*Example VI*

Synthesis of the compound represented by the formula:

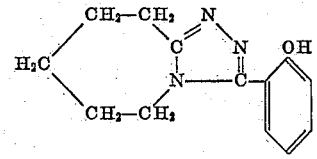

About 45 parts by weight of caprolactime-O-methyl ether are instilled at 40° C. into a solution of 60.7 parts of 2-hydroxybenzoylhydrazine in 300 parts of methanol. The temperature of the reaction mixture rises to 55° C. and a condensate precipitates in a short time. The mixture then is heated one hour at 50°–60° C. to effect cyclization, followed by suction-filtration while hot. The normally sparsely soluble final product so obtained can be recrystallized from dimethylformamide and is found to melt near 260–265° C. This product is the compound of the formula above set forth.

*Example VII*

Synthesis of the compound represented by the formula:

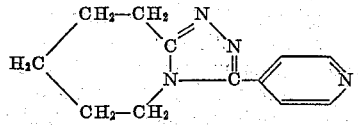

Approximately 30 parts by weight of caprolactime-O-methyl ether are slowly instilled into a solution of 27.4 parts by weight of isonicotinic acid hydrazide in 400 cubic centimeters of methanol. The mixture turns faintly yellow. After about three minutes, pale-yellow crystals precipitate, with evolution of heat, and half an hour later they are recovered by suction-filtration while the mixture is hot. The intermediate compound so obtained is very sparsely soluble in dimethylformamide and in water; but it dissolves in dilute hydrochloric acid and can be reprecipitated from it unchanged by addition of sodium hydroxide solution. Yield: about 40 parts by weight, melting at M.P. 208°–210° C. Analytical studies of this compound indicate it has the empirical formula $C_{12}H_{16}ON_4$, and the structural formula:

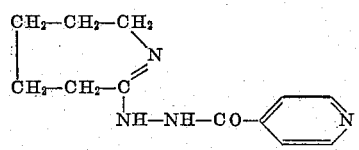

For conversion of this product into the desired cyclized final product represented by the formula first above set forth, 50 parts by weight thereof are dissolved in 200 parts by weight of boiling glacial acetic acid. The initially yellowish color of the solution disappears after brief heating; then the glacial acetic acid is removed by evaporation in vacuo, yielding a colorless syrup which is taken up with ether, from which large crystals separate after prolonged standing at 0° C. However, as the crystals deliquesce when in contact with air, the compound is best isolated as its hydrochloride. For this purpose, the syrup is dissolved in alcohol and concentrated hydrochloric acid is added causing the hydrochloride of the base to precipitate in the form of silky needles, which are recovered by suction-filtration and washed with alcohol. Yield: 49 parts by weight. This product sinters from 245° C. and melts between 248° and 255° C.

*Example VIII*

Synthesis of the compound represented by the formula:

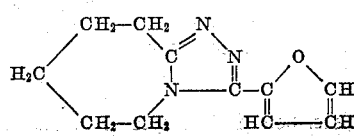

A solution of 25.2 parts by weight of pyromucic acid hydrazide in 200 parts by weight of methanol is mixed with 30 parts by weight of caprolactime-O-methyl ether and the mixture is heated to 70° C. for 18 hours. The characteristic odor of the caprolactime ether now disappears. The clear solution, after being concentrated somewhat in vacuo, is cooled to a very low temperature, causing precipitation of crystals which, after recrystallization from glycol monomethyl ether acetate, melt at 151–153° C. Yield: 23.2 parts by weight of the compound represented by the formula above.

*Example IX*

Synthesis of the compound represented by the formula:

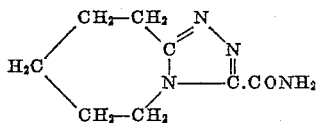

A solution of 28 parts by weight of caprolactime-O-methyl ether in methanol is mixed with 20.6 parts by weight of oxalic acid amide hydrazide, and the mixture is boiled on a water bath. After about 6 hours, the oxalic acid amide hydrazide goes into solution. On refluxing of the methanolic solution for another 10 hours and subsequent cooling, a nearly quantitative yield of crystallized 3-carbamoyl 4,5-pentamethylene-1,2,4-triazole is obtained. This compound, after recrystallization from water, melts at 189°–190° C. Its hydrochloride decomposes at 245° C.

*Example X*

Synthesis of the compound represented by the formula:

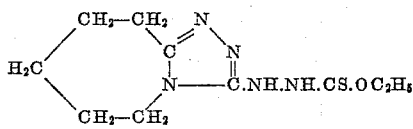

About 19.4 parts by weight of the ethyl ester of thiocarbohydrazide-1-monothiocarboxylic acid of the formula $H_2N-NH-CS-NH-NH-CS-OC_2H_5$ are refluxed with 15 parts by weight of caprolactime-O-methyl ether in 300 cubic centimeters of methanol for about one hour. The reddish solution so obtained is allowed to stand in vacuo for 12 hours and then it is evaporated under vacuum. The partially crystallized, somewhat oily residue is triturated with a small amount of alcohol, filtered under suction and the residue is recrystallized from alcohol. The final product so obtained, the substance represented by the formula above set forth, is in the form of fine needle-like crystals that are found to melt at 198–200° C.

The ethyl ester of thiocarbohydrazide-1-monothiocarboxylic acid used as a starting material in preparing this product may be obtained in the usual manner from thiocarbohydrazide and sodium xanthoacetate in water; its melting point is 166° C.

*Example XI*

Synthesis of the compound represented by the formula:

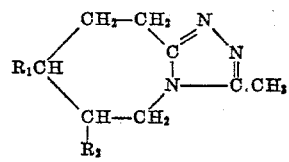

wherein $R_1$ and $R_2$ are different substituents chosen from the group consisting of hydrogen and methyl.

C-methyl-caprolactime-O-methyl ether which may be prepared by Beckmann rearrangement of a mixture of the oximes of m- and p-methylcyclohexanone and monoacetylhydrazine are reacted in boiling methanol in the manner described in Example I. After distillation of methanol and water, there remains a viscous, colorless oil having a boiling point of 232°–234° C. at a pressure of 15 millimeters of mercury which easily forms a neutral-reacting aqueous solution. The compound has the formula above set forth and is obtained in a yield of about 80% of theory.

*Example XII*

Synthesis of the compound represented by the formula:

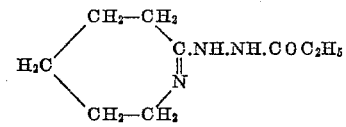

About 50.8 parts by weight of caprolactime-O-methyl ether are instilled, with stirring at 0°–5° C., into a solution of 35.2 parts by weight of monopropionylhydrazine in 200 parts by weight of methanol, over a period of about one hour. After one hour, an intermediate condensation product of the formula:

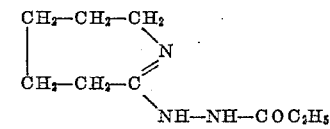

begins to precipitate in abundance, forming colorless crystals. The reaction mixture is allowed to stand at 0°–5° C. for 15 hours; the crystals which separate then are recovered by suction-filtration and washed with cold methanol. The yield of this intermediate condensation product is about 45 parts by weight or 67% of theory. An additional amount of the compound may be recovered from the mother liquor by the usual methods. The compound dissolves in water to produce a weakly alkaline solution.

A hydrochloride of this base, formed with one mole of hydrochloric acid, is very readily water-soluble and crystallizes only after intensive concentration.

This intermediate may be cyclized by further treatment as described in the foregoing examples. The final product so obtained, 3-ethyl-4,5-pentamethylene-1,2,4-triazole, corresponds to the following formula:

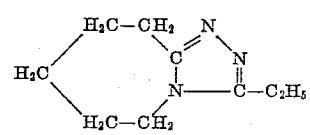

In the same way there may be obtained the next homologues using butyroyl-, valeroyl hydrazide and the like.

*Example XIII*

Synthesis of the compound represented by the formula:

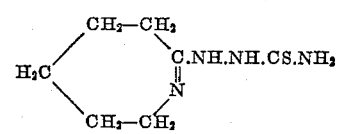

About 18.2 parts by weight of thiosemicarbazide are suspended in 200 parts by weight of methanol, and 30 parts by weight of caprolactime-O-methyl ether are instilled into the suspension. The mixture is refluxed until complete solution is effected, then it is allowed to cool. The initial crystal crop is discarded because it may retain some starting material. After several hours standing at low temperature, the somewhat concentrated solution precipitates the major portion of the desired condensation product in crystalline form. This new compound, when heated, decomposes at 240°–250° C. It has the empirical formula $C_7H_{14}N_4S \times \frac{1}{2} H_2O$ and the structural formula above set forth.

Example XIV

Synthesis of the compound represented by the formula:

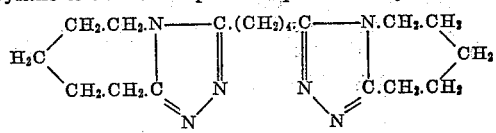

About 34.8 parts by weight of finely ground adipic acid dihydrazide are suspended in a solution of 60 parts by weight of caprolactime-O-methyl ether in 400 parts of methanol. The suspension is heated to its boiling point. Complete solution is effected within 2 hours, but the mixture is boiled under reflux for a further 4 hours, then it is evaporated in vacuo. The residual syrup crystallizes when triturated with ethyl acetate, giving 47.5 parts of a crude product which is recrystallized, first from glycol monomethyl ether acetate, then from water or dimethylformamide. The purified product melts at 139–141° C.

Example XV

Substantially equimolecular proportions of monoacetylhydrazine and delta-valerolactime-O-methyl ether

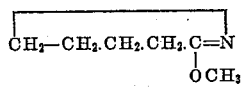

are reacted together by mixing at about room temperature, then the intermediate product so obtained is cyclized by boiling in methanol under reflux for about fifteen hours. The reaction mixture is steam distilled under vacuum to remove methanol and water, leaving the reaction product, 4,5-tetramethylene-3-methyl-1,2,4-triazole, the substance represented by the formula:

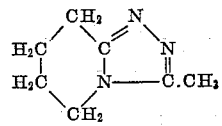

It is obtained in nearly quantitative yield and is found to boil at about 224° C. at a pressure of 14 millimeters of mercury and to melt at 85°–86° C. It crystallizes from water with one mole of water of crystallization and then is found to melt at 54°–55° C. It, and its hydrochloride salt, are readily water soluble. The hydrochloride salt, of course, may be prepared readily by treating the free base with hydrochloric acid, and other salts may be prepared in like manner.

Example XVI

Synthesis of the compound represented by the formula:

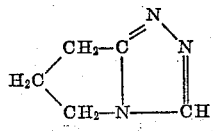

Substantially equimolecular proportions of monoformylhydrazine and gamma-butyrolactime-O-methyl ether

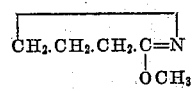

(boiling point about 118° C. at a pressure of 760 millimeters of mercury), which may be obtained by reaction of dimethyl sulfate on gamma-butyrolactam are reacted together in a methanol reaction medium at a temperature of about 0°–10° C. The reaction mixture is allowed to stand about 15 hours at this temperature, then the intermediate reaction product having the formula:

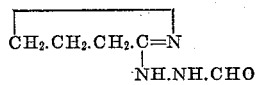

(M.P. 138°–140° C. after recrystallization from a mixture of alcohol and ether), is cyclized by boiling the mixture under reflux for about 15 hours. After the methanol and water have been removed by distillation under vacuum, the reaction product of the formula first above set forth is recovered. It is found to be a very hygroscopic substance, melting at about 65° C. and boiling at 200°–202° C. at a pressure of about 0.6 millimeter of mercury. Its hydrochloride salt melts at about 195°–197° C.

Example XVII

The procedure described in Example I is repeated, substituting an equimolecular proportion of monoacetylhydrazine for the monoformylhydrazine and effecting the initial condensation reaction at a temperature of about 20° C. The intermediate product so obtained is the substance represented by the formula:

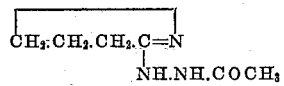

melting at 193°–194° C. following crystallisation from ethanol. This intermediate is cyclized by boiling in glacial acetic acid for two hours, yielding the desired final reaction product, the substance represented by the formula:

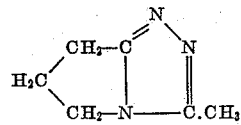

This product is very hygroscopic, melts at 60°–63° C. and boils at 194–196° C. at a pressure of 1.2 millimeters of mercury. Its hydrochloride, after being recrystallised from dilute hydrochloric acid, is found to melt at 200°–203° C.

Example XVIII

The procedure described in Example I is repeated, substituting an equimolecular proportion of oxalic acid amide hydrazide for the monoformylhydrazine. After cyclizing by boiling in methanol under reflux for 20 hours, the desired final reaction product is obtained. This product is the substance represented by the formula:

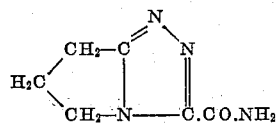

which, after being recrystallized from water, is found to melt at 182°–183° C.

Example XIX

The procedure described in Example I is repeated, substituting an equimolecular proportion of adipic acid dihydrazide for the formylhydrazine and using twice the molecular proportion of the lactime starting material in the initial condensation reaction. The intermediate product so obtained is cyclized by boiling under reflux in methanol for 20 hours, yielding the desired final product, the substance represented by the formula:

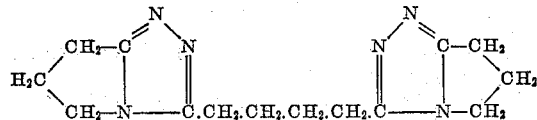

which, after recrystallisation from water, is found to melt with decomposition at 247°–249° C.

Example XX

To a boiling solution of 54.8 parts of isonicotinic acid hydrazide in 400 parts of methanol is introduced while stirring a solution of 39.6 parts of γ-butyro-lactim-O-methyl ether in 50 parts of methanol, during a period of 30 minutes. The solution becomes slightly yellow and after a boiling period of 8 hours the condensation product of the following formula crystallizes

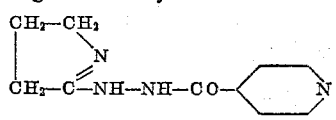

The compound is obtained in colorless crystals melting at 127–128° C. The yield amounts to about 87% of the theoretical.

If the solution of the compound of the above formula is heated with 4 parts of glacial acetic acid for 30 minutes under reflux, there is obtained the 4,5-trimethylene-3-pyridyl-1,2,4-triazol of the following formula

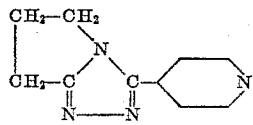

Example XXI

If equimolecular amounts of γ-valero-lactim-O-methyl ether and isonicotinic acid hydrazide are reacted in methanol for a period of three hours at 20° C. and then for a period of 15 hours at the boiling temperature of methanol there is obtained in a yield of 90% the 4,5-tetramethylene-3-pyridyl-1,2,4-triazol, melting at 165–166° C., having the following formula

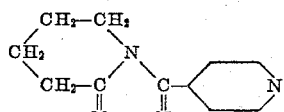

Example XXII

If 34.8 parts of adipic acid hydrazide, dissolved in 300 parts of methanol are reacted wtih 45.2 parts of valerolactim-O-methyl ether at first three hours at 20° C., and then 20 hours at the reflux temperature of methanol there are obtained after distilling off the methanol, colorless crystals which melt at 185–186° C. After having been recrystallized from glycol monomethyl ether acetate the yield amounts to 80–90% of the theoretical. The new compound corresponds to the following formula

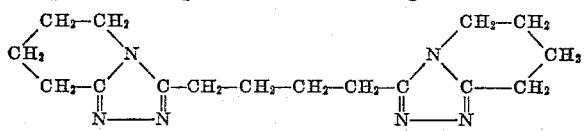

Example XXIII

If molecular amounts of nicotinic acid hydrazide and caprolactim-O-methyl ether in methanolic solution are reacted at the boiling temperature of methanol for 10 hours there is obtained the compound of the following formula

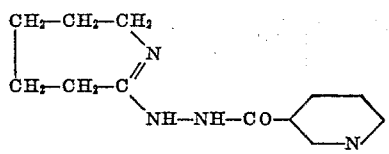

which melts after recrystallizing from glycol monomethyl ether acetate at 107–108° C.

If one part of this compound is boiled in 4 parts of acetic acid there is split off 1 mol of water and there is obtained the compound of the following formula

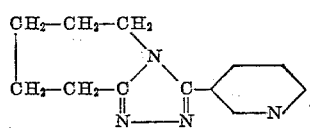

which may be recrystallized from glycol monomethyl ether acetate and then melts at 81–82° C.

Example XXIV

If molecular amounts of 2-methoxy benzhydrazide and caprolactim-O-methyl ether are reacted in boiling methanol for 10 hours there is obtained after having distilled off the solvent, the compound of the following formula

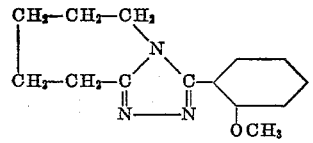

which may be recrystallized from the ethanol and then melts at 160–161° C.

Example XXV 20.2 parts of 2-oxy-3-naphthoic acid hydrazide are dissolved in 200 parts of tetrahydrofuran, while gently warming the solvent. At temperature of 30° C. there are added rapidly 50 parts of caprolactim-O-methyl ether. The reaction is exothermic and the temperature rises about 20° C. After 10 minutes the condensation product of the following formula begins to crystallize

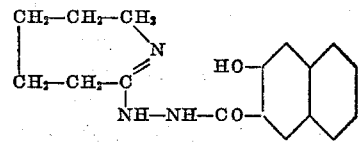

The compound is easily soluble in glacial acetic acid. If this compound is heated for a short period in boiling glacial acetic acid there is obtained the following compound of the formula

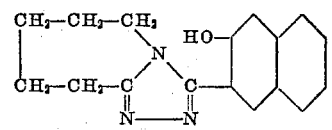

which is only sparingly soluble even in boiling glacial acetic acid and which melts at 306–308° C.

Example XXVI 15.5 parts of capryllactim-O-methyl ether (boiling point 14 mm. 80–81° C., and which may be obtained by rearrangement of cyclooctanone to capryllactam and methylating of the latter with dimethyl sulfate in benzenic solution) are dissolved in 200 parts of methanol, and 6 parts of formyl hydrazine are added. The reaction mixture stands 16 hours at 25° C. and then is allowed to stand a further period of ten hours at the boiling temperature of methanol. After distilling off the methanol there is obtained the 4,5-heptamethylene-1,2,4-triazol of the formula

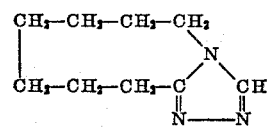

as a viscose oil in a yield of 80–90% of theory. The raw material may be purified by vacuum distillation, thereby distilling at 0.1 ml. Hg.

The corresponding methyl homologue, wherein the C-atom in the triazin ring bears the CH₃-group may be obtained in exactly the same manner but using 7.4 parts of acetyl hydrazine. This new compound distills at 0.2 ml. Hg at 171–174° C. and melts at 39–40° C. The easily soluble hydrochloric acid salt melts at 166–168° C.

Using the corresponding amount of oxalic acid amide hydrazide, there is obtained the compound of the formula

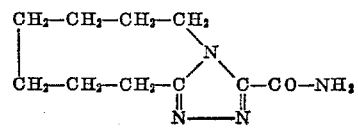

which may be recrystallized from water and then melts at 176–178° C.

If the corresponding molecular amount of isonicotinic acid hydrazide is reacted in boiling methanol under the above described conditions there is obtained the 4,5-heptamethylene-3-pyridyl-1,2,4-triazol of the formula

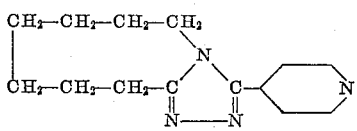

which may be recrystallized from benzene, then melting at 117–119° C. The hydrochloric acid salt of this compound melts at 115–117° C. under decomposition, after having been recrystallized from water.

Having thus described the subject matter of this invention, what it is desired to secure by Letters Patent of the United States is:

1. A method of preparing a chemical substance represented by the formula:

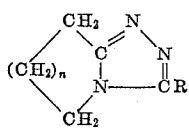

wherein R is a monovalent substituent selected from the group consisting of hydrogen, alkyl comprising at most 4 carbon atoms, cyanoalkyl wherein the alkyl group comprises at most 4 carbon atoms, alkoxyalkyl wherein the alkoxy and alkyl groups individually comprise at most 4 carbon atoms, phenyl, nitrophenyl, hydroxyphenyl, pyridyl, furyl, carbamoyl, and alkoxythionocarbonohydrazo wherein the alkoxy group comprises at most 4 carbon atoms and $n$ is a whole number less than six, which comprises reacting a cyclic lactime ether having 5 to 10 carbon atoms with an acylhydrazine at a temperature from about 0° C. to about 150° C.

2. As a novel composition of matter, a chemical substance represented by the formula:

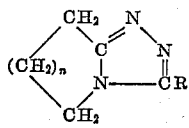

wherein R is a monovalent substituent selected from the group consisting of hydrogen, cyanomethyl, methoxymethyl, phenyl, p-nitrophenyl, o-hydroxyphenyl, gamma-pyridyl, alpha-furyl, carbamoyl, ethoxy, and ethoxythionocarbonohydrazo, and $n$ is a whole number less than six.

3. Compounds as defined in claim 2 wherein R is hydrogen.

4. Compounds defined in claim 2 wherein R is cyanomethyl.

5. Compounds as defined in claim 2 wherein R is methoxymethyl.

6. Compounds as defined in claim 2 wherein R is phenyl.

7. Compounds as defined in claim 2 wherein R is p-nitrophenyl.

8. Compounds as defined in claim 2 wherein R is o-hydroxyphenyl.

9. Compounds as defined in claim 2 wherein R is gamma-pyridyl.

10. Compounds as defined in claim 2 wherein R is alpha-furyl.

11. Compounds as defined in claim 2 wherein R is carbamoyl.

12. Compounds as defined in claim 2 wherein R is ethoxythionocarbonohydrazo.

13. As a novel composition of matter, 2-substituted 3,4,5,6,7-pentahydroazepine wherein said substituent is alkoxy-hydrazo wherein the alkoxy group comprises at most 4 carbon atoms.

14. As a novel composition of matter, 2-substituted 3,4,5,6,7-pentahydroazepine wherein said substituent is methoxyhydrazo.

15. As a novel composition of matter, 2-substituted 3,4,5,6,7-pentahydroazepine wherein said substituent is thionosemicarbazido.

16. As a novel composition of matter, 2-substituted 3,4,5,6,7-pentahydroazepine wherein said substituent is benzenesulfonylhydrazo.

17. As a novel composition of matter, a chemical substance represented by the formula:

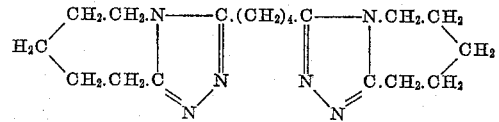

18. As a new composition of matter, 4,5-tetramethylene-3-alkyl-1,2,4-triazole wherein the alkyl group comprises at most 4 carbon atoms.

19. As a new composition of matter, 4,5-tetramethylene-3-methyl-1,2,4-triazole.

20. The compound defined by claim 2 wherein R is hydrogen and $n$ is 5.

21. The compound defined by claim 2 when R is hydrogen and $n$ is 3.

22. The compound defined by claim 2 when R is gamma-pyridyl and $n$ is 3.

23. The compound defined by claim 2 when R is methoxymethyl and $n$ is 3.

References Cited in the file of this patent

Patterson et al.: Ring Index, ACS Monograph No. 84, page 116 (1940).